Dec. 14, 1926.

C. DANTSIZEN 1,610,751

ELECTRIC BOILER AND METHOD OF OPERATION

Filed Feb. 19, 1924

Inventor:
Christian Dantsizen,
by *Alexander D. Lunt*
His Attorney.

Patented Dec. 14, 1926.

1,610,751

UNITED STATES PATENT OFFICE.

CHRISTIAN DANTSIZEN, OF SCHENECTADY, NEW YORK, ASSIGNOR TO GENERAL ELECTRIC COMPANY, A CORPORATION OF NEW YORK.

ELECTRIC BOILER AND METHOD OF OPERATION.

Application filed February 19, 1924. Serial No. 693,871.

The present invention relates to the operation of devices for generating steam by the heating effect of an electric current conducted directly through water which is to be vaporized. These devices usually are provided with iron electrodes, which dip into the water constituting the resistance heater. They are operated with alternating currents and usually at relatively high voltage, say several thousand volts. Trouble has been experienced in the past in the operation of these devices by the rapid corrosion of the electrodes. In some cases corrosion also was accompanied by the formation of scale upon the electrodes which interfered with the passage of current.

As electrode corrosion occurred both with "soft water," that is, water with a very low mineral content and with "hard water"; that is, with a high mineral content, it was not to be expected that modification of the electrolyte constituent of the water would prevent corrosion and scale formation.

I have discovered that electrode corrosion and scaling may be overcome, by treating the water intended to conduct the electric current with a definite amount of an alkali; for example, a predetermined amount of calcium hydroxide. The amount of alkali should be in excess of the amount required to render the water neutral, and should be regulated in accordance with the operating voltage to maintain the electrical resistance within desired limits. My invention includes as a new apparatus, the combination of an electric boiler and means for charging the feed water therefor continuously with alkali.

Figure 1:
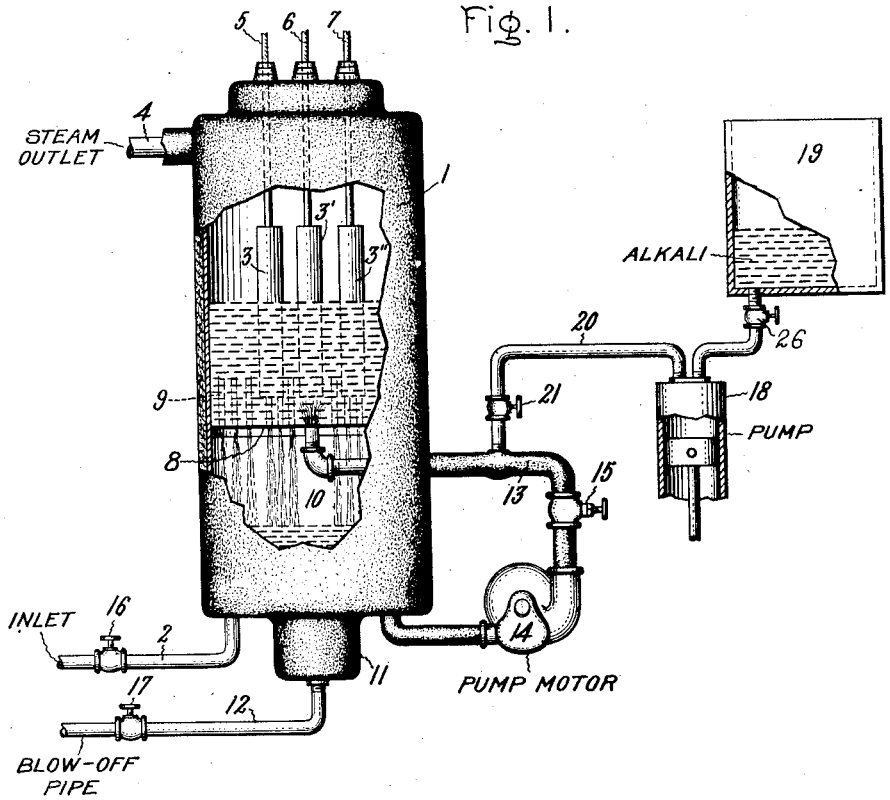
Figure 2:
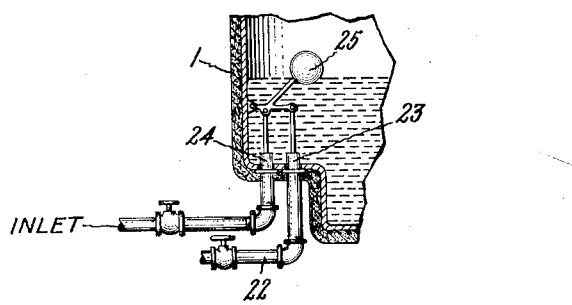

The accompanying drawing shows in Figure 1, an electric boiler equipped with an apparatus for charging the feed water with alkali, and Figure 2 is a sectional view of part of a boiler provided with an alternative feed device.

The apparatus shown in Figure 1 comprises a tank 1, consisting of steel, or sheet iron, which is lagged with heat insulation material as shown by the stippling in Fig. 1 of the drawing and is provided with a water inlet pipe 2, electrodes 3, 3' and 3'' which may consist of iron, and a steam outlet pipe 4 which leads to steam consumption devices (not shown). The electrodes are connected by the conductors 5, 6, 7 suitably insulated from the tank as indicated, to a source of electric energy (not shown). The tank 1 is provided with a partition 8 having a number of overflow pipes 9, through which water may overflow from the electrode chamber to the lower compartment 10. The latter is provided with a sump 11 which communicates with a blow-off pipe 12 to permit of the removal of impurities which settle out in the sump. Water is circulated between the upper and lower compartments through a pipe 13 in which a motor-driven pump 14 is intercalated. By regulating the valve 15 or the speed of the pump 14, the height of the water in the electrode chamber may be varied at will to permit the apparatus to operate with a desired energy input and hence to secure a desired steam pressure or output. The pipes 2 and 12 are provided with suitable valves 16, 17 as indicated. The features of the apparatus so far described do not constitute my invention, but they have been described to explain the relation between the novel features and the rest of the apparatus.

When the described apparatus is supplied with water from natural sources, the electrode troubles already noted above occur during its operation unless provision is made in accordance with my invention to render the water slightly alkaline.

As shown in Figure 1 this may be done by introducing into the circulating water pipe 13, an alkaline solution, as for example, lime water, or a solution of sodium or potassium hydroxide by a pump 18 which draws the solution from the reservoir 19 and forces the same into a pipe 20 which communicates with the pipe 13. The pump 18 is of the constant pressure type. The valve 21 in the pipe 20, is regulated to give with a predetermined water feed and circulating water pressure, a required admixture of alkali with the raw feed water. If the raw water contains dissolved calcium bicarbonate, $Ca(HCO_3)_2$, the neutral less soluble carbonate, $CaCO_3$, is formed which precipitates and is blown out through the pipe 12. If the water contains only dissolved carbon dioxide and perhaps organic acids produced from organic matter in the soil, the acid becomes neutralized and a low but definite alkalinity is established. Ordinarily, when using calcium hydroxide, $Ca(OH)_2$, I prefer to add about one pound of calcium hydroxide per thousand gallons of water in excess of the amount of hydroxide required to precipitate lime; that is, to soften the water, assuming an operating potential of about 1000 volts. The higher the operating voltage the less should be the free alkali content. In other words, the free alkali content will vary inversely with the operating voltage.

Water thus rendered slightly alkaline, causes no precipitation of scale at the electrodes. There also is less liberation of hydrogen due to electrolysis, usually less than 0.01 cubic inch of hydrogen per ampere hour of current.

As shown in Figure 2, the alkaline solution may be admitted directly into the boiler by a pipe 22 having a valve 23 connected together with the water intake valve 24 to a float 25 both valves opening and closing simultaneously. When the water level falls, the float is lowered and opens both the water supply valve 24 and the alkali solution supply valve 23.

By means of a hand valve 26, or other suitable means the proportion of alkali to a given amount of inflow of feed water can be regulated so as to produce the desired excess of alkali in the boiler water.

What I claim as new and desire to secure by Letters Patent of the United States, is:—

1. The method of treating water containing carbonic acid constituents to render the same suitable for use as a resistance in electric boilers which consists in adding alkali thereto in excess of the amount required to render the water neutral, the excess being proportioned with respect to the operating voltage to maintain a desired conductivity.

2. The method of operating an electric boiler having water-immersed electrodes in which the consumption of water is made up by the addition of water containing carbonic acid constituents which consists in adding alkali with the feed water in such excess that a desired conductivity is maintained and removing the precipitate caused by the addition of the alkali.

3. The method of treating water for electric boilers which consists in adding thereto calcium hydroxide in such proportion that a desired low alkalinity is established therein, the amount of excess of alkalinity varying inversely with the operating voltages of the boiler for which the water is intended.

4. The method of treating water intended for resistance purposes in electric boilers which consists in adding to the water calcium hydroxide in proportion of about one to two pounds of hydroxide to one thousand gallons of water in excess of the amount required for rendering the water neutral.

In witness whereof, I have hereunto set my hand this 18th day of February, 1924.

CHRISTIAN DANTSIZEN.